(12) United States Patent
Kanbe (10) Patent No.: US 7,307,780 B2
(45) Date of Patent: Dec. 11, 2007

(54) ELECTROPHORETIC DISPLAY SHEET, ELECTROPHORETIC DISPLAY, ELECTRIC APPARATUS, AND METHOD OF MANUFACTURING ELECTROPHORETIC DISPLAY SHEET

(75) Inventor: Sadao Kanbe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/640,322

(22) Filed: Dec. 18, 2006

(65) Prior Publication Data

US 2007/0097490 A1 May 3, 2007

Related U.S. Application Data

(62) Division of application No. 11/423,088, filed on Jun. 8, 2006, now Pat. No. 7,193,770.

(30) Foreign Application Priority Data

Jul. 29, 2005 (JP) ............... 2005-220206
Oct. 14, 2005 (JP) ............... 2005-300928

(51) Int. Cl.
*G02B 26/00* (2006.01)
*G09G 3/34* (2006.01)

(52) U.S. Cl. ...................... 359/296; 345/107

(58) Field of Classification Search ............... 359/296; 345/107

See application file for complete search history.

(56) References Cited

U.S. PATENT DOCUMENTS

| 5,956,005 | A  | * | 9/1999 | Sheridon ............... 345/84 |
| 5,961,804 | A  |   | 10/1999 | Jacobson et al. |
| 6,906,851 | B2 | * | 6/2005 | Yuasa ............... 359/296 |
| 2005/0094247 | A1 |  | 5/2005 | Kanbe |

FOREIGN PATENT DOCUMENTS

KR    2004-0018186 A    6/2004

\* cited by examiner

*Primary Examiner*—Jordan Schwartz
*Assistant Examiner*—James C Jones
(74) *Attorney, Agent, or Firm*—Oliff & Berridge, PLC (57) ABSTRACT

A method of manufacturing an electrophoretic display sheet that includes: applying a mixture of a plurality of microcapsules and a binder on a substrate, the substrate having a first contact angle $θ1$ between a reference liquid, each of the microcapsules having a second contact angle $θ2$ between the reference liquid, the binder having a third contact angle $θ3$ between the reference liquid, the $θ1$, the $θ2$, and the $θ3$ having a relationship of $θ3>θ2>θ1$; and evaporating the mixture to form an electrophoretic layer on the substrate, the electrophoretic layer including the plurality of the microcapsules.

5 Claims, 7 Drawing Sheets

ELECTROPHORETIC DISPLAY SHEET, ELECTROPHORETIC DISPLAY, ELECTRIC APPARATUS, AND METHOD OF MANUFACTURING ELECTROPHORETIC DISPLAY SHEET

This is a Division of application Ser. No. 11/423,088 filed Jun. 8, 2006 now U.S. Pat. No. 7,193,770. The disclosure of the prior application is hereby incorporated by reference herein in its entirety.

BACKGROUND OF THE INVENTION

1. Technical Field

The invention relates to an electrophoretic display, which makes use of movement of charged molecules in an electric field for displaying information, and its manufacturing process.

2. Related Art

Broadly speaking, an electrophoretic display is constituted by an electrophoretic layer provided between a pixel electrode substrate and a common electrode substrate. The electrophoretic layer includes more than one kind of colored electrophoretic particle and a liquid phase disperse medium, which makes the electrophoretic particle movable, and is sealed between the both substrates. And when a pixel signal (voltage) corresponding to two-dimensional image information is applied between each pixel electrode of the pixel electrode substrate and the common electrode substrate, a position of the electrophoretic particle is set corresponding to a level of the pixel signal, whereby an image is formed. As referenced above, the electrophoretic particles move in the disperse medium, while if the electrophoretic display tilts, uneven distribution (unbalanced) of the electrophoretic particles can occur. To prevent this, the electrophoretic layer is divided by partition members or a plurality of electrophoretic particles and the disperse medium are wrapped in a wall member and made into microcapsules. For example, U.S. Pat. No. 5,961,804 shows an example in which the electrophoretic layer of the electrophoretic display is formed by micro-encapsulation.

U.S. Pat. No. 5,961,804 is an example of related art.

In a case where the electrophoretic layer is formed by micro-encapsulation, to form an intricate image, the microcapsules need to be compactly coated all over the substrate without a gap such that a film needs to be made without a gap while microcapsules are tightly in contact with one another.

However, in a currently available technique of forming the electrophoretic layer through the microcapsules, a liquid in which the microcapsules are dispersed is coated on the substrate and dried, thus making it easy to produce gaps among the microcapsules. It is difficult to adjust concentration of the microcapsules in the disperse liquid as well as coating work so as to prevent such phenomenon.

Now, it may be conceived to coat the disperse liquid in advance, so that the electrophoretic layer becomes a thick film in advance, while this is held between two electrode substrates to push the microcapsule layer inside, thereby sticking one microcapsule to another very closely. However, such arrangement causes residual stress (restoring force) to generate inside the microcapsule layer, and exfoliation and deformation tend to occur between the electrophoretic layer and the electrode substrate. In case of a large-sized substrate, overall pressuring (holding) itself is difficult to be applied. Further, if the disperse liquid solidifies, deformation is difficult to occur, hence, before the disperse liquid dries up, the electrode substrates need to be glued together.

SUMMARY

An advantage of the invention is to provide an electrophoretic display sheet and an electrophoretic display which enable an electrophoretic layer, in which microcapsules adhere closely together, to be formed on an electrode substrate to provide for intricate image display.

A further advantage of the invention is to provide a manufacturing process of an electrophoretic display sheet and an electrophoretic display which enable an electrophoretic layer, in which the microcapsules adhere closely together, to be formed more easily on the electrode substrate.

According to a first aspect of the invention, an electrophoretic display sheet of the invention includes: a substrate; and an electrophoretic layer made into a film on the substrate, including a plurality of microcapsules, in which an electrophoretic disperse medium containing at least one kind of electrophoretic particle is sealed, and a binder bonding or fixing the microcapsules to one another, wherein a degree of affinity of the substrate, the microcapsule, and the binder is respectively formed such as to increase in order of the microcapsule, the binder and the substrate.

At this point, the electrophoretic display sheet is that which is made up of an electrophoretic layer formed on the substrate. Further, the affinity is determined by an angle of contact between the substrate and a reference liquid, the angle of contact between the microcapsule and the reference liquid, and the angle of contact between the binder and the reference liquid. The reference liquid is, for example, water, but not limited to this, and a selection can be made as appropriate.

According to such constitution, when the binder entwined around the microcapsules attempt to spread along the substrate, it operates to extend the microcapsules at a broader width along the substrate. As each microcapsule spreads on the substrate, adhesion among the microcapsules becomes tighter, thereby making it possible to obtain an electrophoretic display sheet having an electrophoretic layer without a gap between one microcapsule and another. This enables an electrophoretic display capable of forming intricate imagery to be obtained.

According to a second aspect of the invention, the electrophoretic display sheet includes a substrate; and an electrophoretic layer made into a film on the substrate, including a plurality of microcapsules, each of the plurality of microcapsules including an electrophoretic disperse medium and at least one kind of electrophoretic particle, and a binder bonding the microcapsules to one another, wherein the affinity between the binder and the substrate and the affinity between the binder and the microcapsule are set to be higher than the affinity between the microcapsule and the substrates.

Even in such constitution, when the affinitive binder entwined around the microcapsules attempt to spread along the substrate, it operates to extend the microcapsules at a broader width along the substrate. As each microcapsule spreads on the substrate, adhesion among the microcapsules becomes tighter, thereby making it possible to obtain an electrophoretic display sheet having an electrophoretic layer without a gap between one microcapsule and another. This enables an electrophoretic display capable of forming intricate imagery to be obtained.

Preferably, the electrophoretic layer has a planar structure with one microcapsule tightly adhering to another due to the affinity of the binder. This makes it possible to obtain an electrophoretic display sheet having an electrophoretic layer with the microcapsules tightly adhering to one another without a gap.

Preferably, the binder includes, for example, a water-soluble resin. This makes it possible, for example, for the affinity between the wall member of the water-soluble microcapsule and the binder to improve significantly, so that when the binder attempts to spread over the substrate, the microcapsules also spread because of wettability of the binder and are fixed on the substrate.

Preferably, the wall member of the microcapsule includes a water-soluble resin. This enables the affinity among the microcapsule, for example, the binder including the water-soluble resin and the substrate to improve significantly. When the binder attempts to spread on the substrate, the microcapsules also spread due to surface tension of the binder and are fixed on the substrate.

Further, an electrophoretic display according to the invention includes: a first and a second substrates which are placed mutually opposite to each other, and on each opposite surface of which electrodes are respectively formed; and an electrophoretic layer made into a film on the first substrate, including a plurality of microcapsules, in which an electrophoretic disperse medium containing at least one kind of electrophoretic particle is sealed, and a binder bonding the microcapsules to one another, wherein a degree of affinity of the first substrate, the microcapsule, and the binder is respectively formed such as to increase in the order of the microcapsule, the binder and the first substrate.

According to such constitution, when the binder entwined around the microcapsules attempt to spread along the first substrate, it operates to extend the microcapsules at a broader width along the substrate. As each microcapsule spreads on the first substrate, adhesion among the microcapsules becomes tighter, thereby making it possible to obtain an electrophoretic display layer with the microcapsules packed with no gap between one microcapsule and another. As a result, an electrophoretic display capable of forming intricate imagery can be obtained.

According to a third aspect of the invention, a manufacturing process of an electrophoretic display of the invention includes: coating, on a substrate which is a first angle of contact relating to a reference liquid, a mixture of a plurality of microcapsules which is a second angle of contact relating to the reference liquid, and the binder which is a third angle of contact relating to the reference liquid; and drying the substrate coated with the mixture and forming an electrophoretic layer including the plurality of microcapsules, wherein a relationship of $\theta 3 > \theta 2 > \theta 1$ holds where the first angle of contact is $\theta 1$, the second angle of contact is $\theta 2$, and the third angle of contact is $\theta 3$.

Preferably, applying lyophilic processing to the substrate prior to coating the mixture is included.

Preferably, applying lyophilic processing includes plasma processing and ozone processing.

Through such constitution, it is possible to form an electrophoretic layer in which the microcapsules adhere closely together. An electrophoretic display sheet (electrophoretic display) of high contrast by curbing uneven display can be obtained. Further, since no external pressure is applied to between the substrates as in the currently available technique, residual stress of the microcapsules (or restoring force) contributes to not generating exfoliation and distortion between the substrates.

BRIEF DESCRIPTION OF THE DRAWINGS

The invention will be described with reference to the accompanying drawings, wherein like numbers refer to like elements.

DESCRIPTION OF THE EMBODIMENTS

Embodiments of the invention will be described as follows with reference to the drawings.

Electrophoretic Display Sheet and Electrophoretic Display

Figure 1:
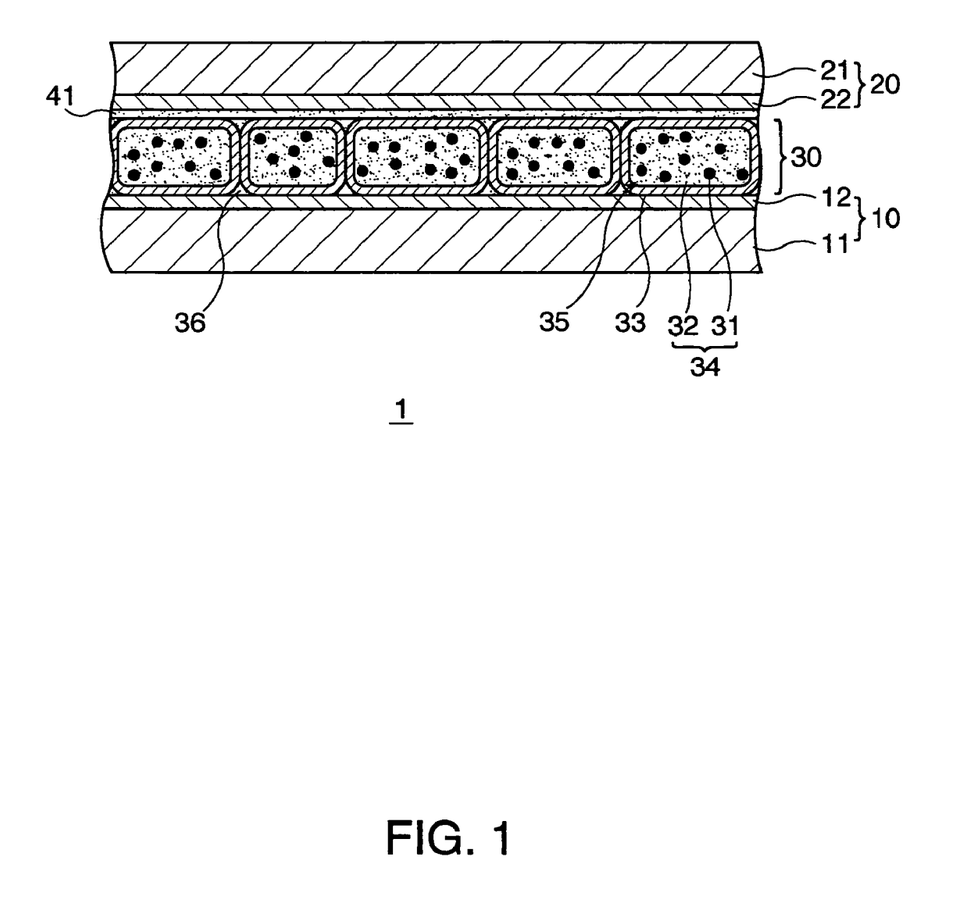
FIG. 1 is a longitudinal section showing an embodiment an electrophoretic display according to the invention.

FIG. 1 is a longitudinal section of an embodiment of an electrophoretic display according to the invention.

In this working example, a common electrode substrate 10 as a substrate and an electrophoretic layer 30 formed thereon constitute an electrophoretic display sheet. However, the electrophoretic layer 30 may be formed on a pixel electrode substrate 20, and these may be used as an electrophoretic display sheet. In this case, the same result can be obtained even if the common electrode substrate 10 is replaced by the pixel electrode substrate 20.

An electrophoretic display 1 consists of the common electrode substrate 10 which formed a common electrode 12 on a substrate 11, an electrophoretic layer 30 which is formed by utilizing surface tension of a binder 36, as explained later, on microcapsules 35 including electrophoretic particles 31, a plurality of drive elements, which are respectively driving a plurality of pixel electrodes arrayed in a matrix pattern on the substrate 21 and each pixel, and a pixel electrode substrate 20 constituted by forming a pixel electrode circuit 22 including a plurality of wiring and the like.

The common electrode substrate 10 and the pixel electrode substrate 20 are placed opposite to each other in a manner of sandwiching the electrophoretic layer 30. In this working example, since the microcapsules 35 of the electrophoretic layer 30 are packed without a gap in a stone wall shape or a tile shape as expeditiously as possible, for example, the affinity of the microcapsule 35, the binder 36, and the common electrode substrate 10 is controlled (or set).

For example, when water is set as a reference liquid for measuring the affinity of each material and each substrate, the microcapsule 35, the binder 36, and the common electrode substrate 10 have respective affinity to water. Further, each material and each substrate are selected so that a degree of affinity to water increases in order of the microcapsule 35, the binder 36, and the common electrode substrate 10.

Or materials and substrates are selected so that the affinity between the binder 36 and the common electrode substrate 10 and the affinity between the binder 36 and the microcapsule 36 become larger than the affinity between the microcapsule 35 and the common electrode substrate 10.

Large affinity herein means a small difference of an angle of contact relating to the reference liquid. For example, when there is a large lyophilic property of the substrate and the microcapsule 35 (in the strict sense of the word, a wall member 33 which is a constituent element of the microcapsule 35), it means a small difference (A–B) between the angle of contact (A) of water to the substrate and the angle of contact (B) of water to the wall member 33.

Further, when there is a large lyophilic property between the microcapsule 35 and the binder 36, it means a small difference between the angle of contact of water to the wall member 33 and the angle of contact of water to the binder 36.

The common electrode substrate 10 forms a common electrode 12 in a layer on the substrate 11.

A pixel electrode substrate 20 forms in a layer, on the substrate 21, a pixel electrode circuit layer 22 which includes pixel electrodes in a matrix pattern corresponding to a number of pixels and active elements.

It is preferable that the pixel and part of the wiring of the pixel electrode circuit layer 22 are a transparent electrode film such as ITO and that a drive element is an active element such as a thin film transistor (TFT).

Substrates 11 and 21 employed for the electrode substrate have, as a raw material, a plastic material in a sheet shape, such as glass or polyethylene terephthalate (PET). Further, its thickness (average) is set as appropriate depending on respective components and usage, and there is no particular limitation. For example, in a case where a substrate having flexibility is to be used, its thickness is preferably on the order of 20 to 500 µm, and more preferably, on the order of 25 to 250 µm. This makes it possible to proceed with miniaturizing the electrophoretic display 1 (especially, making into a thin type) while maintaining harmony between flexibility and strength.

For the common electrode 12, that which has transparency of light with ITO, ZnO and the like as its material, preferably, what is virtually transparent (colorless and transparent, colored transparent or semitransparent) is acceptable. This enables status of an electrophoretic particle 31 in an electrophoretic disperse liquid 32 to be explained later, that is, information (image) displayed in the electrophoretic display 1 to be easily recognizable through visual examination.

Further, its thickness (average) is set as appropriate depending on components, usage, and the like. There is no particular limitation. But preferably it is on the order of 0.05 to 10 µm, more preferably on the order of 0.05 to 5 µm.

With respect to the common electrode substrate 10, to secure affinity with the binder 36 and the microcapsule 35 (wall member 33) to be explained later, lyophilic processing such as plasma irradiation and ozone irradiation is suitable. Note that if the substrate has the affinity originally desired, it is not particularly necessary to apply lyophilic processing.

The electrophoretic layer 30 is a single layer (not overlaying in a thickness direction but one by one) in which a plurality of microcapsules 35 are arrayed in a row vertically and horizontally without mutual gaps through the binder 36, and it is made into a film on the common electrode substrate 10. This enables the electrophoretic display 1 to exhibit better display performance.

This microcapsule 35 is constituted by wrapping the electrophoretic disperse liquid 34 with the wall member 33. As the component of the wall member 33, for example, that which has the water-soluble characteristic can be used. Take, for instance, a compound of gum arabic and gelatin as well as various resin materials such as a urethane resin and a melamine resin. Of these, one kind or a combination of more than two kinds can be used.

It is preferable for such microcapsules 35 to have an approximately uniform size. This enables the electrophoretic display 1 to have uniform quality of display and to exhibit better display performance.

The electrophoretic disperse liquid 34 is obtained by dispersing (suspension) with a dispersing method such as stirring at least one kind of electrophoretic particle 31 with a liquid disperse medium 32.

So long as electrophoretic particle 31 has a property of electrification and is a molecule which is electrophoretic in the liquid phase disperse medium 32 through action of the electric field, there is no special limitation. Pigment molecules such as titanium oxide, resin molecules such as an acrylic resin, or at least one kind of these compound molecules may be suitably used.

An average particle size (diameter of average particle in volume) of the electrophoretic particle 31 is preferably on the order of 0.1 to 10 µm. If the average particle size of the electrophoretic particle 31 is too small, a sufficient contrast ratio cannot be obtained mainly in a visible light region. As a result, it is considered that a display contrast of the electrophoretic display 1 may drop.

On the other hand, if the average particle size of the electrophoretic particle 31 is too large, depending on factors such as its kind, it tends to precipitate, so that deterioration of display quality of the electrophoretic display 1 may be considered.

As the liquid phase disperse medium 32, that which has comparatively high insulating property such as dodecyl benzene is suitably used.

Further, as necessary, a disperse and charge control agent such as a titanium type coupling agent and an aluminum type coupling agent may be added into the liquid phase disperse medium 32 (electrophoretic disperse liquid 34).

Still further, as necessary, various dyes such as an anthraquinone dye and an azo dye may be dissolved in the liquid phase disperse medium 32.

Of resin materials excelling in affinity with the common electrode substrate 10 and the capsule wall member 33 (microcapsule 35) and excelling in insulating property, for example, one kind or a combination of more than two kinds of water-soluble high molecule materials such as polyvinyl alcohol and cationic cellulose may be suitably used.

In the working example, there is shown an embodiment which is a film of the electrophoretic layer 30 made on the common electrode substrate 10. The film may be made on the pixel electrode substrate 20, and in that case, lyphilic processing is applied onto the pixel electrode substrate 20.

In the constitution referenced above, when a voltage is impressed between the pixel electrode circuit layer 22 (of a pixel electrode) and the common electrode 12, an electric field generates therebetween. This electric field causes the electrophoretic particle 31 to move inside the microcapsule 35 and an image is displayed.

In forming the electrophoretic layer 30 as referenced above, the affinity among the microcapsule 35, the binder 36, and the common electrode substrate 10 are utilized as explained later. Accordingly, by means of the surface tension of the binder 36, each microcapsule 35 is deformed into the common electrode substrate 10 side and film-making free from any gap is made between one microcapsule to another. The microcapsule layer is fixed on the common electrode substrate 10 by the binder 36.

Consequently, without pressuring between the substrates and distorting the microcapsules 35 like the currently available technique, and also without being concerned about quality deterioration such as exfoliation of the common electrode substrate 10 and uneven display due to residual stress (or restoring force) of the microcapsules 35, it is possible to obtain, through a simpler manufacturing process, the electrophoretic display 1 which provides high image quality.

Figure 4:
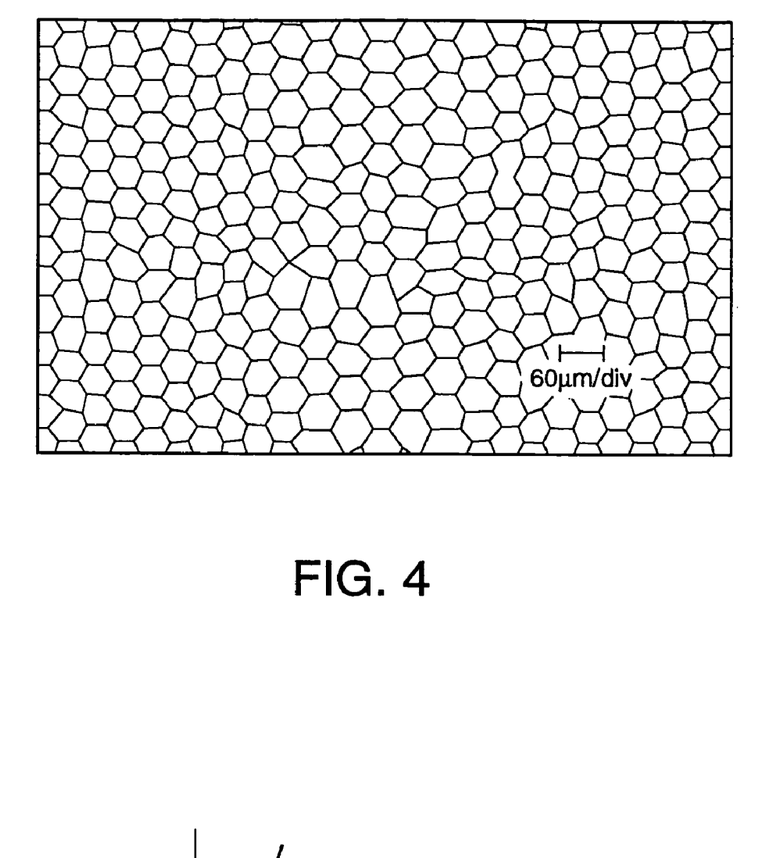
FIG. 4 is an explanatory diagram to explain a state of an electrophoretic layer of an electrophoretic display according to the invention.

FIG. 4 schematically shows an example (plan view) of a state of the microcapsules 35 of the electrophoretic layer 30 in the working example as viewed from above. It is seen that the microcapsules 35 are mutually formed in the shape of the stone walls or the tiles with very few gaps among the microcapsules.

Figure 8:
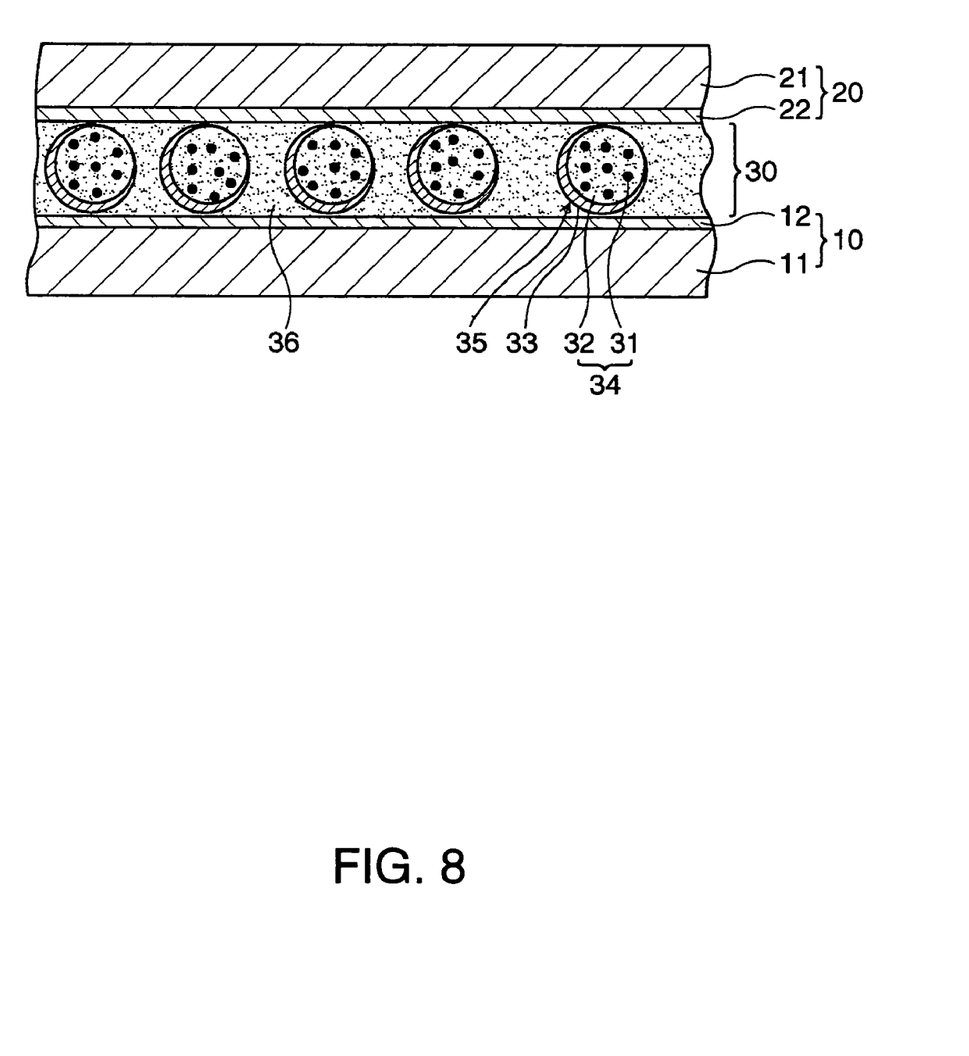
FIG. 8 is a longitudinal section of an electrophoretic display as a comparison example.

FIG. 8 shows a comparison example. Elements in this figure corresponding to elements in FIG. 1 are given like numbers and description of such elements is omitted.

In the comparison examples, the electrophoretic layer is simply coated on one of the two substrates 10 and 20, and a structure is such as to sandwich it with two substrates. Consequently, there is a gap between one microcapsule 35 to another.

By comparison to the electrophoretic display of this comparison example, according to the constitution of the working example, a film is made while the microcapsules 35 forming the electrophoretic layer are being packed with no gaps among themselves, hence, no uneven display quality is produced thus to enable high resolution image display to be made.

Further, in the comparison example, if an attempt should be made to array the microcapsules tightly without a gap by changing the shape of the microcapsules as in this working example, it is necessary to pressure externally the substrates themselves, which sandwich the electrophoretic layer 30 including the microcapsules, so as to deform the microcapsules. However, that is not necessary in this working example, so there are no chances such as substrate exfoliation and deformation due to residual stress of the microcapsules which could generate in case of pressuring, and high resolution image display can be stably obtained.

Manufacturing Process

FIG. 2 is a presentation with scheduling drawings of a manufacturing process of the electrophoretic display (electrophoretic display sheet) shown in FIG. 1.

Figure 2A:
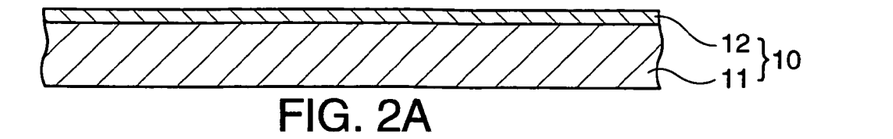
FIG. 2 presents schedule drawings to explain a manufacturing process of an electrophoretic display shown in FIG. 1.

First, as shown in FIG. 2A, in process A, the common electrode 12 is formed on the substrate 11 and the common electrode substrate 10 is manufactured. After the formation, lyophilic processing is applied to a substrate surface of an electrode side of the common electrode substrate 10. For lyophilic processing, plasma irradiation, ozone irradiation and the like are suitable. By carrying out such processing, an electrode surface of ITO and the like of the substrate surface is activated, thus improving wettability.

Figure 2B:
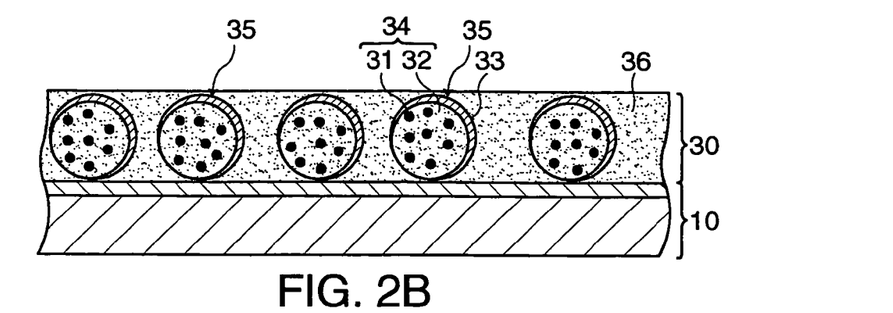

Next, as shown in FIG. 2B, in process B, a mixture of pre-mixed microcapsules 35 and the binder 36 is coated on the common electrode substrate 10 (to be more specific, on the common electrode 12) so that there is uniform coating.

As a coating method, a doctor blade method, a spin coat method and the like are suitable. As referenced above, the microcapsule 35, the binder 36, and the common electrode substrate 10 have respective affinity. Further, the material and the substrate are selected or formed such that the degree of affinity may increase in the order of the microcapsule 35, the binder 36, and the common electrode substrate 10.

Figure 2C:
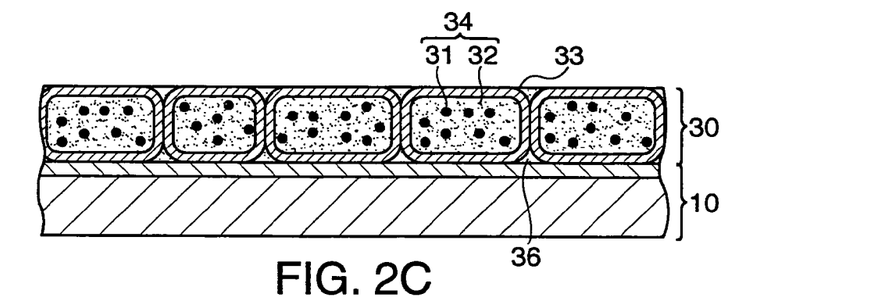

As shown in FIG. 2C, in process C, the mixture of the micro-capsules 35 and the binder 26 uniformly coated in process B is dried for about 10 minutes at a temperature of 90° C., and the microcapsules 35 are made into a film without gap on the common electrode substrate 10 through the binder 36 and fixed.

Figure 3A:
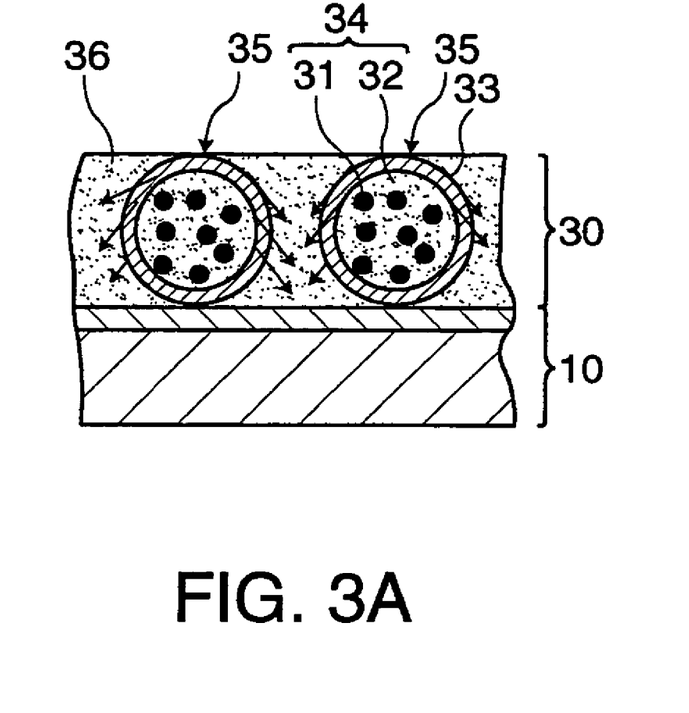
FIG. 3 presents explanatory diagrams to explain operations in an embodiment of an electrophoretic display according to the invention.

FIG. 3 are explanatory diagrams to explain operation when the microcapsules 35 are made into a film on the common electrode substrate 10. FIG. 3A shows a state where the mixture of microcapsules 35 and the binder 36 is coated on the common electrode substrate 10. As referenced above, the microcapsule 35, the binder 36, and the common electrode substrate 10 have respective affinity and are formed so that the degree of affinity increases in the order of the microcapsule 35, the binder 36, and the common electrode substrate 10.

Or the affinity between the binder 36 and the common electrode substrate 10 and the affinity between the binder 36 and the microcapsule 35 are set to be higher than the affinity between the microcapsule 35 and the common electrode substrate 10.

For example, when water is set as the reference liquid, it is set up such that a relationship $\theta 3>\theta 2>\theta 1$ holds where the angle of contact between the common electrode substrate 10 subjected to lyophilic processing and water is $\theta 1$, the angle of contact between the material of the binder 36 and water is $\theta 2$, and the angle of contact between the material of the microcapsule 35 and water is $\theta 3$.

Figure 5:
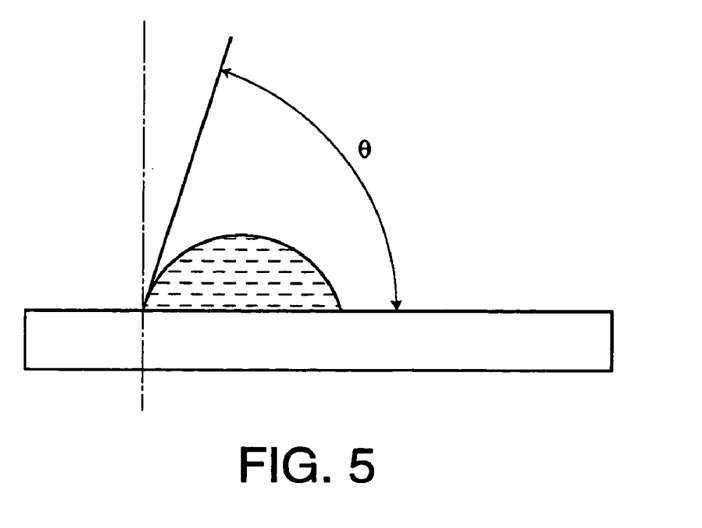
FIG. 5 is an explanatory diagram to explain characteristics (angle of contact) of materials in a manufacturing process of an electrophoretic display according to the invention.

At this point, as shown in the explanatory diagram of FIG. 5, the angle of contact $\theta$ is an angle formed by a tangential line drawn from a point of contact between the liquid and a solid into a perpendicular plane of the solid when the liquid is in contact with the solid surface. It is also called a "wet angle." In case of being wettable, the angle of contact becomes an acute angle, while in case of being not wettable, the angle of contact becomes an obtuse angle.

In the working example, for example, there are $\theta 1=3.5°$ in regard to the substrate after ozone irradiation, $\theta 2=47°$ in regard to the binder which used polyvinyl alcohol, and $\theta 3=67°$ in regard to the wall member by the compound material of gum arabic and gelatin. Note that the binder and the wall member are measured when they are respectively in the film state.

Figure 3B:
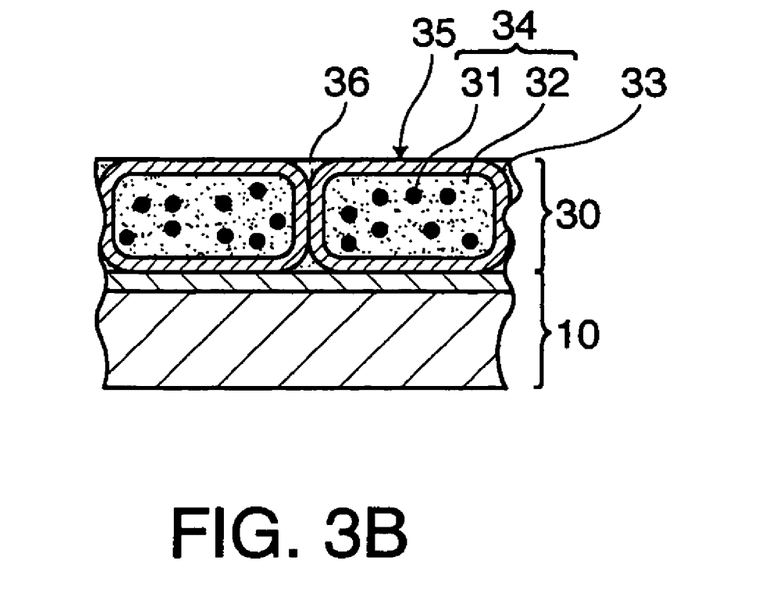

As shown in FIG. 3B, under the conditions described above, as the binder 36 entwined around the microcapsules 35 attempts to spread along the common electrode substrate 10, a surface tension of the binder 36 causes to expand the microcapsules 35 themselves (in the direction of arrow). Expanded microcapsules 35 are fixed on the common electrode substrate 10 in a single layer (one by one without overlaying in the thickness direction) in the stone wall shape or the tile shape arrayed in a row vertically and horizontally with no mutual gaps.

In this manner, the electrophoretic display sheet is manufactured.

Figure 2D:
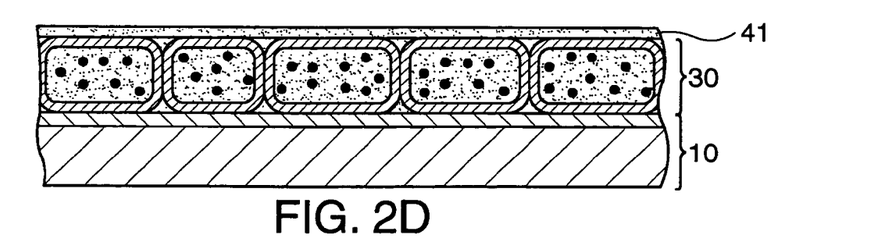

As shown in FIG. 2D, in process D, an adhesive 41 for sticking the pixel electrode substrate 20 arranged opposite to the common electrode substrate 10 is coated on the electrophoretic layer 30 which was made into a film. In coating the adhesive, it may be on the entire surface or periphery of the electrophoretic layer 30, so long as the microcapsules 35 are sealed with the pixel electrode substrate 20 and the common electrode substrate 10.

Figure 2E:
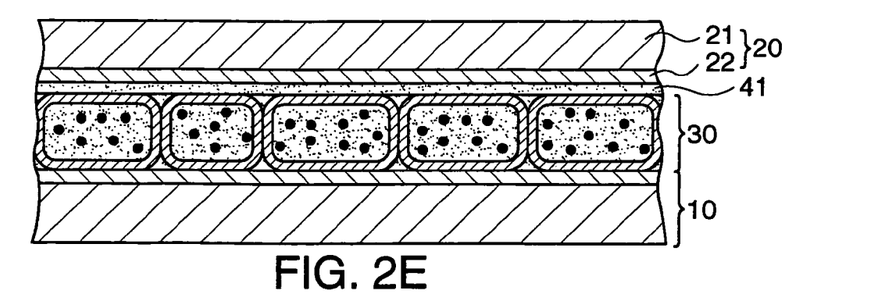

Finally, as shown in FIG. 2E, in process E, the pixel electrode substrate 20 made by a separate process is glued to the common electrode substrate 10 such that its electrode side surface joins the adhesive 41, thereby sealing and fixing the electrophoretic layer 30 which was made into a film. In this way, an electrophoretic display using the electrophoretic display sheet is obtained.

FIG. 4 shows the electrophoretic layer 30 in the film state obtained as a result of process C. In this manner, by pressuring the opposite substrates, without pushing and expanding the microcapsules 35, when the binder 36 entined around the microcapsules 35 spreads on the substrate, the microcapsules themselves expand due to the surface tension of the binder 36. The electrophoretic layer 30 can be made into a film on the common electrode substrate 10 with the microcapsules 35 in the state of being packed without a gap in the stone wall shape or the tile shape.

The electrophoretic display 1 as referenced above can be built into various electric apparatus. Electric apparatus according to the invention equipped with the electrophoretic display will be described as follows.

Figure 6A:
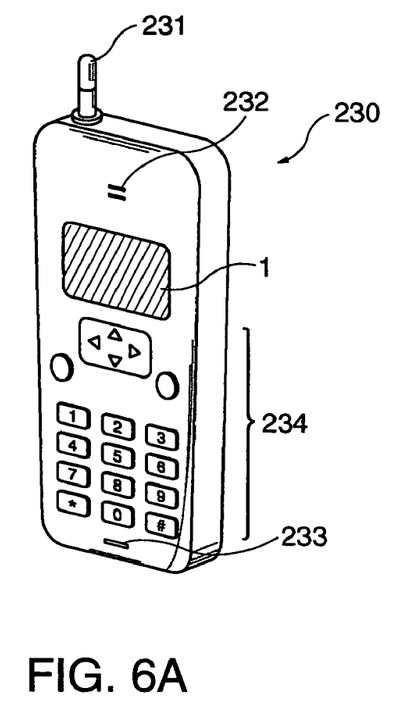
FIG. 6 presents diagrams to show examples of electronic equipment to which an electrophoretic display of the invention is applicable.

FIGS. 6 and 7 are diagrams showing examples of electronic equipment to which the above-referenced electrophoretic display is applicable. FIG. 6A is an example of application to a mobile phone. The mobile phone 230 comprises an antenna part 231, a voice output unit 232, a voice input unit 233, an operating unit 234, and the electrophoretic display 1 of the invention. In this way, the electrophoretic display according to the invention can be used as a display.

Figure 6B:
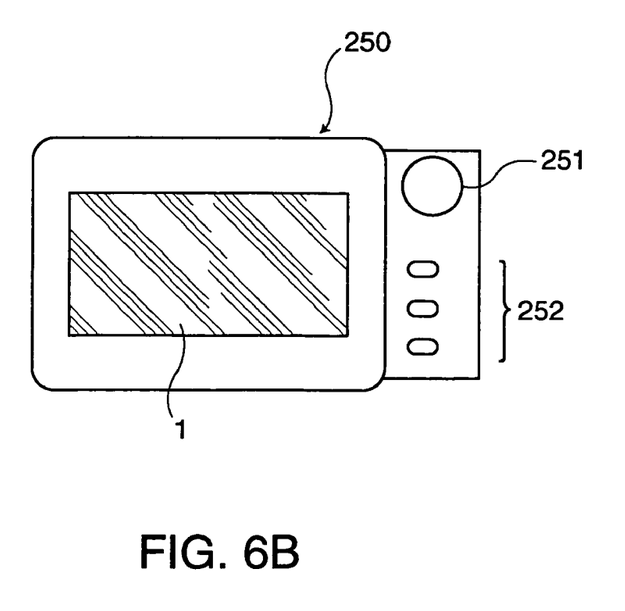

FIG. 6B is an example of application to a portable electronic book, and an electronic book 250 consists of a dial operating part 251, a pushbutton operating part 252, and the electrophoretic display 1 according to the invention.

Figure 7A:
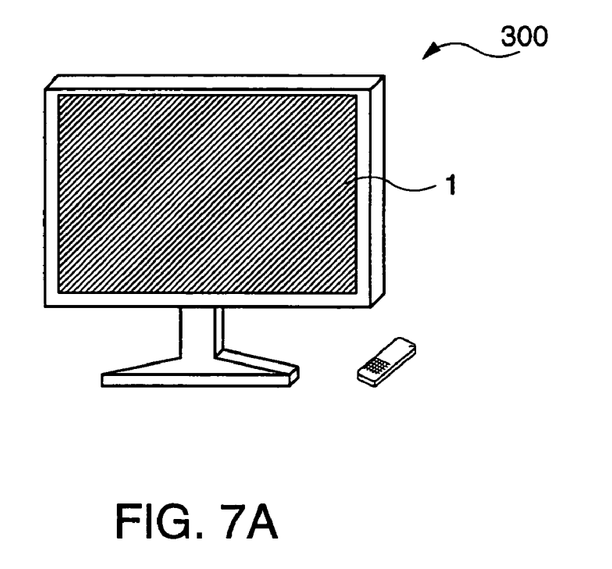
FIG. 7 presents diagrams to show examples of electronic equipment to which an electrophoretic display of the invention is applicable.

FIG. 7A is an example of application to a still image display, and a still image display 300 is provided with the electrophoretic display 1 according to the invention. Note that the still image display according to the invention is likewise applicable to a monitor unit used in a personal computer and the like.

Figure 7B:
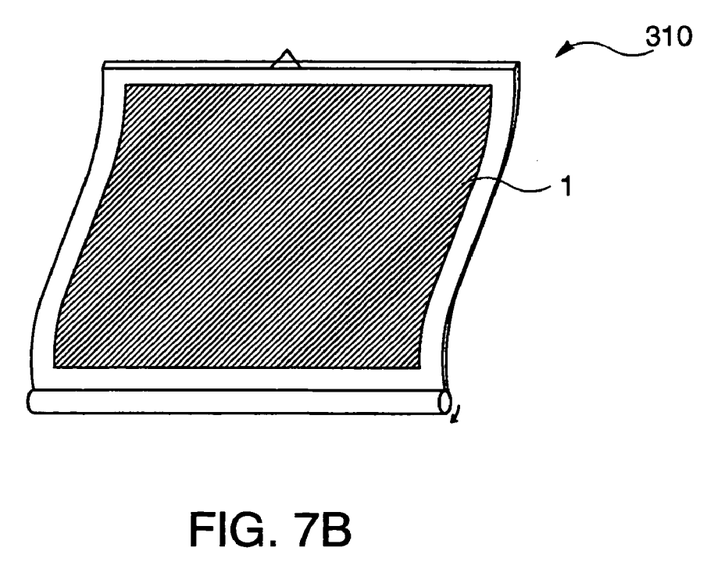

FIG. 7B is an example of application to a roll-up type still image display, and the roll-up type still image display 310 has the electrophoretic display according to the invention.

As described above, based on the illustrated embodiments, description has been made of the electrophoretic sheet, the electrophoretic display, the manufacturing process of the electrophoretic display, and the electric apparatus using the electrophoretic display according to the invention. While the invention is not limited to these working examples, the constitution of each part or unit can be replaced with any constitution having like functions. Further, any other constituent element may be added to the invention.

Furthermore, the invention may be a combination of more than any two constitutions (characteristics) out of each embodiment referenced above.

What is claimed is:

1. A method of manufacturing an electrophoretic display sheet, comprising:
    applying a mixture of a plurality of microcapsules and a binder on a substrate, the substrate having a first contact angle $\theta 1$ between a reference liquid, each of the microcapsules having a second contact angle $\theta 2$ between the reference liquid, the binder having a third contact angle $\theta 3$ between the reference liquid, the $\theta 1$, the $\theta 2$, and the $\theta 3$ having a relationship of $\theta 3 > \theta 2 > \theta 1$; and
    evaporating the mixture to form an electrophoretic layer on the substrate, the electrophoretic layer including the plurality of the microcapsules.

2. A method of manufacturing an electrophoretic display sheet according to claim 1, including:
    applying lyophilic processing to lessen the angle of contact of the substrate relating to the reference liquid, prior to coating the mixture in the manufacturing process of the electrophoretic display sheet.

3. The manufacturing process of the electrophoretic display sheet according to claim 1, wherein the reference liquid is water in the manufacturing process of the electrophoretic display sheet.

4. A method of manufacturing an electrophoretic display comprising the method of manufacturing the electrophoretic display sheet according to claim 1.

5. A method of manufacturing an electric apparatus comprising the method of manufacturing the electrophoretic display according to claim 4.

* * * * *